United States Patent [19]

Kinsell et al.

[11] 4,018,060

[45] Apr. 19, 1977

[54] AIR CONDITIONING SYSTEM FOR AIRCRAFT

[75] Inventors: Robert C. Kinsell, Los Angeles; James C. Noe, Canoga Park; Carl D. Campbell, Cerritos, all of Calif.

[73] Assignee: The Garrett Corporation, Los Angeles, Calif.

[22] Filed: Aug. 29, 1975

[21] Appl. No.: 609,130

[52] U.S. Cl. .................................. 62/91; 62/96; 62/172; 62/402; 60/599; 123/119 CD

[51] Int. Cl.² .................................. F25D 17/06

[58] Field of Search ............ 62/86, 87, 88, 90, 91, 62/96, 172, 401, 402, DIG. 5; 98/1.5; 123/119 CD; 60/599

[56] References Cited

UNITED STATES PATENTS

| | | | |
|---|---|---|---|
| 2,526,103 | 10/1950 | Wood | 62/87 X |
| 3,595,013 | 7/1971 | Brille et al. | 123/119 CD X |

Primary Examiner—Ronald C. Capossela
Attorney, Agent, or Firm—Joel D. Talcott; Albert J. Miller

[57] ABSTRACT

An open loop air cycle air conditioning system draws ambient air into a turbine for expansion and cooling. The air passes through a heat exchanger where it withdraws heat from recirculated cabin air and is passed to a compressor which is operatively coupled to and driven by the turbine to partially recompress the air. The air is directed from the compressor to the intake manifold of the airplane engine. Valves may be positioned at the ambient air inlet to control the flow of air through the air conditioning system and into the engine. Water can be sprayed into the low pressure air at the heat exchanger to provide substantial additional cooling by evaporation.

17 Claims, 5 Drawing Figures

AIR CONDITIONING SYSTEM FOR AIRCRAFT

This invention relates to air conditioning systems and, more particularly, to an air cycle air conditioning system which may be used in propeller-type aircraft, even those powered by a single reciprocating piston engine.

Heretofore, it has not been practical to use air conditioning systems in single engine propeller-type aircraft. Air conditioning systems for vehicles are basically of two types. One is the closed-loop vapor cycle variety commonly utilized in automobiles and buildings. This type of system is undesirable for use in small aircraft because of high component weight and substantial power requirements which may, in some cases, produce unsafe conditions. The other is the air cycle air conditioning system. This type of system has been utilized extensively in gas turbine driven aircraft wherein the engine includes a compressor which serves as a source of the high pressure air always heretofore considered necessary to power the turbocompressor for efficient system operation.

In accordance with this invention, an air cycle air conditioning system is provided which has extremely low power requirements and can be utilized in airplanes powered by one or more reciprocating piston engines. Engine inlet air having substantially atmospheric pressure is expanded and cooled through a turbine. The cool expanded air is passed into an air-to-air heat exchanger wherein, if desired, water may be sprayed into the air. At the low air pressure, an extremely high rate of evaporation, coupled with the low temperature of expanded air, will result in a substantial removal of heat from recirculated air which is passed through the heat exchanger and returned to the cabin of the airplane. The low pressure air is then passed through a compressor which is driven solely by the turbine, and which compresses the air to an intermediate pressure less than its original ambient pressure. The air is then fed into the intake manifold of the engine which serves as a vacuum source.

By interposing a valve between the air inlet and the turbine, the supply of air to the intake manifold of the engine can be controlled. An additional valve, bypassing the air conditioning system may be provided to feed air directly to the intake manifold of the engine when the engine is operating at power levels in the upper portion of its operating range.

This air conditioning system provides substantial cooling with a minimal drain of power from the engine. Further, it utilizes intake air at substantially ambient pressure so that the source of high pressure air required in prior art systems is completely unnecessary.

These and other advantages of this invention will be more readily apparent when the following specification is read in conjunction with the appended drawings, wherein.

Figure 1:
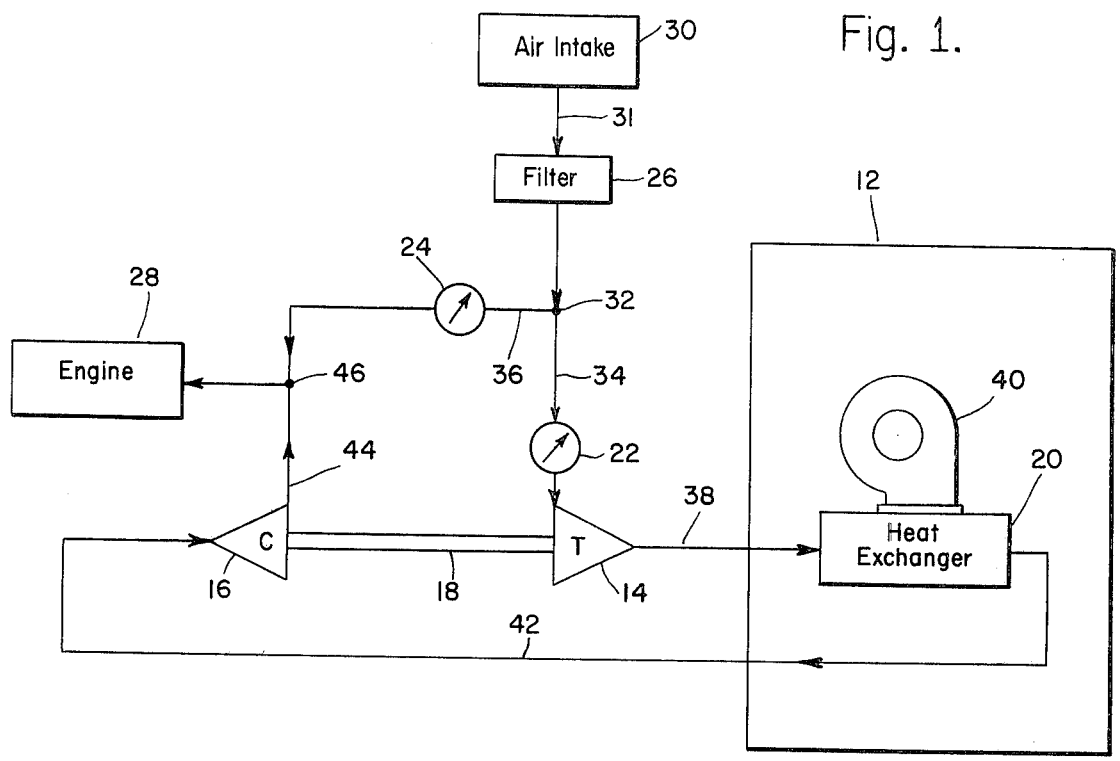
FIG. 1 is a generally schematic view of an air conditioning system in accordance with this invention.

Referring now to the drawings, an air conditioning system in accordance with this invention is illustrated in FIG. 1. The air conditioning system is intended to remove heat from the air of an enclosure 12 to effect cooling of the enclosure. In the preferred embodiment, the air conditioning system is mounted in an airplane (not shown) and the enclosure 12 represents the cabin of the airplane.

The air conditioning system includes a turbine 14 and a compressor 16 mounted for simultaneous rotation on a shaft 18, and an air-to-air heat exchanger 20. A primary throttle valve 22 and a secondary throttle valve 24 and air filter 26 used to clean and control the flow of air to the airplane's propulsion engine 28 are also associated with the system.

The air conditioning system is interposed between the intake manifold of the airplane's propulsion engine 28, which is preferably an internal combustion engine for driving a propeller, and an air intake 30 for providing the air necessary for fuel combustion in the engine 28. While some compression of the air drawn into the air intake 30 may occur, this pressurization will tend to be insignificant so that the air drawn into the air intake 30 generally tends to be at ambient pressure, that is, a pressure substantially identical to that of the air in the atmosphere at that altitude. The air flows from the air intake 30 to the intake manifold of the engine 28 through suitable conduits represented schematically in FIG. 1 by the arrows showing the path of the air flow. The turbine 14, compressor 16 and throttle valves 22 and 24 may be located in the engine compartment while the heat exchanger 20 is mounted in the enclosure 12. However, other arrangements may be used, such as will be described subsequently herein.

Atmospheric air drawn into the air intake 30 is passed via a conduit 31 through the filter 26, which may be of any type capable of removal of particulate impurities from the air stream, to a junction 32 at which two paths provided for the air stream, one directing the air through a conduit 34 to the primary throttle valve 22 and the other directing the air through a conduit 36 to the secondary throttle valve 24.

Air passing through the primary throttle valve 22 is incident upon the turbine 14. This air, in a well known manner, releases energy in rotating the turbine 14, the shaft 18, and the compressor 16. Upon leaving the turbine 14, this energy transfer is reflected in a substantial reduction of both the pressure and temperature of the air.

The cooled, expanded air from the turbine 14 is passed by way of a conduit 38 through one flow path of the air-to-air heat exchanger 20 withdrawing heat from the heat exchanger. Air from the enclosure 12 is circulated through the other flow path of the heat exchanger 20 by a suitable blower 40 giving up heat thereto so that the temperature of the air is substantially reduced.

The heated air from the heat exchanger 20 passes through a conduit 42 to the compressor 16 which is driven solely by the turbine 14. The compressor 16 compresses this air. However, it will be readily understood that sufficient energy is lost thermodynamically and frictionally so that the compressor is unable to bring the pressure of the air back to ambient. Accordingly, it would not be possible to discharge this air into the atmosphere. In accordance with this invention, however, the compressed, heated air is passed through a conduit 44 to a junction 46 from which it passes into the intake manifold of the engine 28 which, as is well known, is at a pressure substantially less than the ambient atmospheric pressure. Thus, the compressor 16 is able to discharge the engine 28 without difficulty.

Except for the electricity used to power the blower 40, substantially no power is used to operate the air conditioning system because its operating power is provided by the pressure differential between the air intake 30 and the intake manifold of the engine 28. Energy normally lost in the throttling process is used instead to power the turbocompressor. Accordingly, the air conditioning system can be effectively utilized while the airplane is one the ground and during those modes of flight where air conditioning is generally required.

The primary throttle valve 22 regulates the amount of air flowing through the air conditioning system to the intake manifold of the engine 28 and is preferably operatively connected to the engine controls of the airplane so that the valve 22 will control the flow of air to the engine to provide the proper fuel-air mixture. The secondary throttle valve 24 will generally by fully closed at cruise and lower power settings so that all air flowing to the engine 28 flows through the air conditioning system. However, it is well known that as the power requirements of an engine increase, its intake manifold pressure increases so that while substantial amounts of air are needed for fuel combustion in the engine, the pressure differential between the air intake 30 and engine 28 will be greatly diminished. Accordingly, at a predetermined engine power setting, the secondary throttle valve 24 opens and begins to control the intake of air to the engine 28 bypassing the air conditioning system.

When the secondary throttle valve 24 is opened, air flow through the air conditioning system is diminished and may ultimately terminate so that operation of the air conditioning system may cease. If the engine power requirement is reduced to a level below the predetermined setting, the secondary throttle valve 24 will again close so that the air conditioning system may again operate in the manner previously described. It should be noted, however, that the power level at which air conditioning operation is terminated is generally substantially above that utilized in cruising operation and would generally be utilized only during takeoff, in emergency operations, in extreme high-speed travel or in traveling at high altitudes; under each of these conditions, air conditioning is either unnecessary or undesirable.

Figure 2:
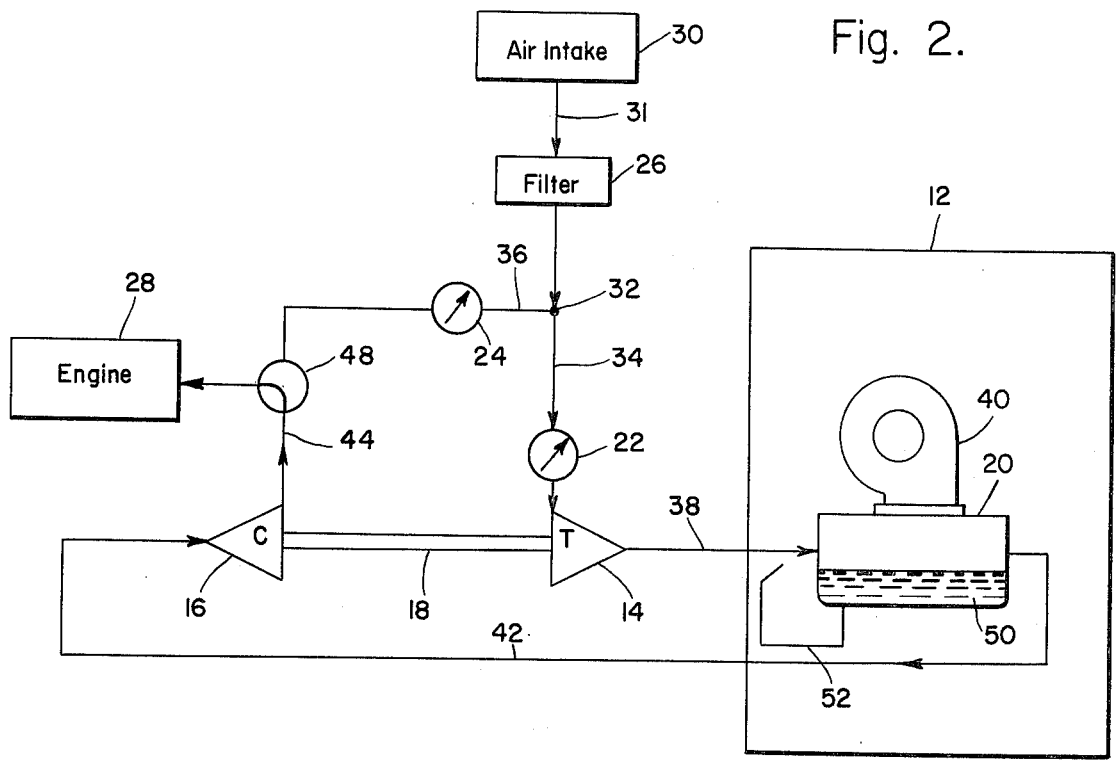
FIG. 2 is a generally schematic view similar to FIG. 1 with a modified throttle valve arrangement and added evaporative cooling.

Referring now to FIG. 2, the air conditioning system is illustrated with modifications in associated components, parts which are the same as those illustrated in FIG. 1 retaining the same reference numerals.

In this embodiment, the throttle valve arrangement has been altered for purpose of illustration by the substitution of a throttle switching valve 48 in place of the junction 46 of FIG. 1. By using the throttle switching valve 48, both the primary throttle valve 22 and secondary throttle valve 24 can be coupled to the airplane engine controls so that they operate in a similar manner throughout the full range of operating speeds of the engine 28. During normal operation, the throttle switching valve 48 is in the position shown in FIG. 2 so that air flows from the air intake 30 through the primary throttle valve 22 and the air conditioning system 10 into the intake manifold of the engine 28 with no air passing through the secondary throttle valve 24.

When it is desired to terminate operation of the air conditioning system due to high engine power requirements of other reasons, the throttle switching valve is rotated 90° in a clockwise direction as shown in FIG. 2 so that all air flow is from the air intake 30 through the filter 26 and secondary throttle valve 24 to the intake manifold of the engine 28. Thus, during normal air conditioning operation, the flow of air to the engine 28 is controlled by the primary throttle valve 22; when operation of the air conditioning system is terminated by either automatic or manual rotation of the valve 48, the flow of air to the engine 28 is controlled by the secondary throttle valve 24.

It is well known that when moisture laden air, such as the air recirculated from the enclosure 12 through the conduit 40 is cooled as in the heat exchanger 20, the moisture in the air condenses and can be collected and removed from the air stream. In accordance with this invention, a suitable water collection means 50 is provided for the heat exchanger 20 to enhance the cooling operation of the air conditioning system.

The water in the water collection means 50 is transported through a suitable water transport means such as a pipe 52 into the conduit 38 where it is sprayed into the stream of air moving into the heat exchanger 20. It should be noted that the air in the conduit 38 is preferably at a pressure substantially less than atmospheric pressure, so that the amount of water which can be absorbed by the air is greatly increased. Accordingly, as the air absorbs heat in the heat exchanger, a substantial quantity of this heat will be used to vaporize the water, thus permitting further heat absorption by the air. By utilizing this evaporative cooling means, the cooling capacity of a given turbocompressor can be greatly increased without increasing the size of the turbocompressor. This substantial additional evaporative cooling is not available in prior art air cycle air conditioning systems because of the necessity of operating at pressures greater than atmospheric pressure at which the evaporation rate is greatly reduced.

After passing through the heat exchanger 20, the air passes through the conduit 42 to the compressor 16 which increases its temperature and pressure. The air then passes through the conduit 44 and throttle switching valve 48 into the intake manifold of the engine 28.

Figure 3:
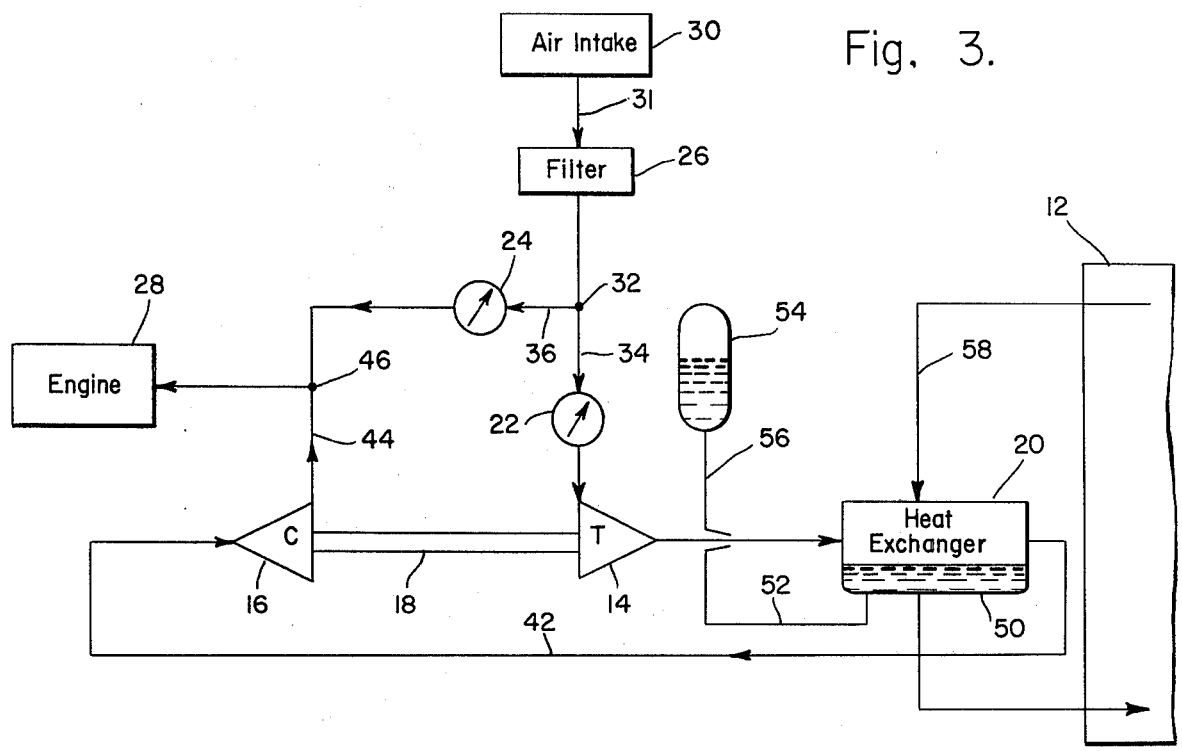
FIG. 3 is a generally schematic view similar to FIG. 1 with evaporative cooling added.

FIG. 3 illustrates the air conditioning system of FIG. 1 with the water collection means 50 and pipe 52 for evaporative cooling. In addition, a water tank 54 and pipe 56 are provided to serve as a source of additional water for evaporative cooling during conditions wherein the water condensed in the heat exchanger 20 and collected in the water collection means 50 is insufficient to provide the desired rate of evaporative cooling. It should be noted that the water tank 54 and pipe 56 can be utilized by themselves to evaporatively cool the air if the utilization of the water condensed by the heat exchanger 20 is not desired. FIG. 3 also illustrates an alternate configuration wherein the heat exchanger is positioned in the engine compartment and air from the enclosure 12 is circulated for cooling through conduits 58.

It is possible the cooling requirements of a particular airplane will necessitate passage of a quantity of air through the air conditioning system which is greater than the quantity of air which can be accommodated by the engine 28. Under such circumstances an arrangement such as that illustrated in FIG. 4 may be used.

Figure 4:
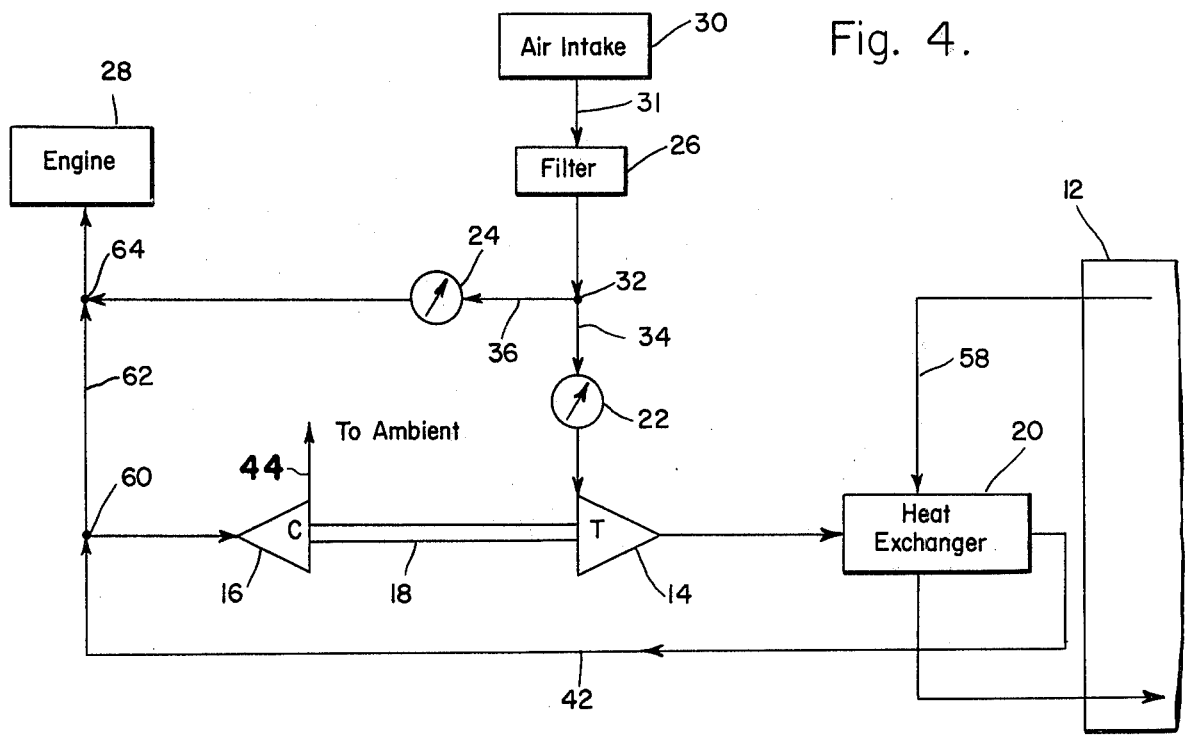
FIG. 4 is a generally schematic view similar to FIG. 1 with modified distribution of the air utilized in the system.

The air conditioning system of FIG. 4 is substantially as illustrated in FIG. 1. However, a junction 60 is interposed in the conduit 42 between the heat exchanger 20 and the compressor 16 and a conduit 62 directs the passage of air from the junction 60 to the intake manifold of the engine 28. The conduit 36 which arrries air during high power requirements of the engine is connected to a junction 64 in the conduit 62. The conduit 44 which carries compressed air from the compressor 16 is connected to discharge the air at ambient pressure, preferably into the atmosphere.

During operation of the air conditioning system of FIG. 4, a portion of the air leaving the heat exchanger 20 through the conduit 42 is fed to the intake manifold of the engine 28, bypassing the compressor 16. The engine withdraws as much air as is necessary for combustion and the remainder of the air is fed to the compressor 16. Because substantially less air is compressed than is used to drive the turbine 14, it will be readily understood by those skilled in the art that sufficient energy is now available to enable the compressor 16 to compress this air to ambient pressure and discharge it into the atmosphere. By provision of this structure, the air conditioning system is capable of operation with a quantity of air substantially greater than that which is required for combustion in the engine with substantially no additional use of power. It should be noted that the evaporative cooling means illustrated in FIGS. 2 and 3 can also be used in the embodiment of FIG. 4.

Figure 5:
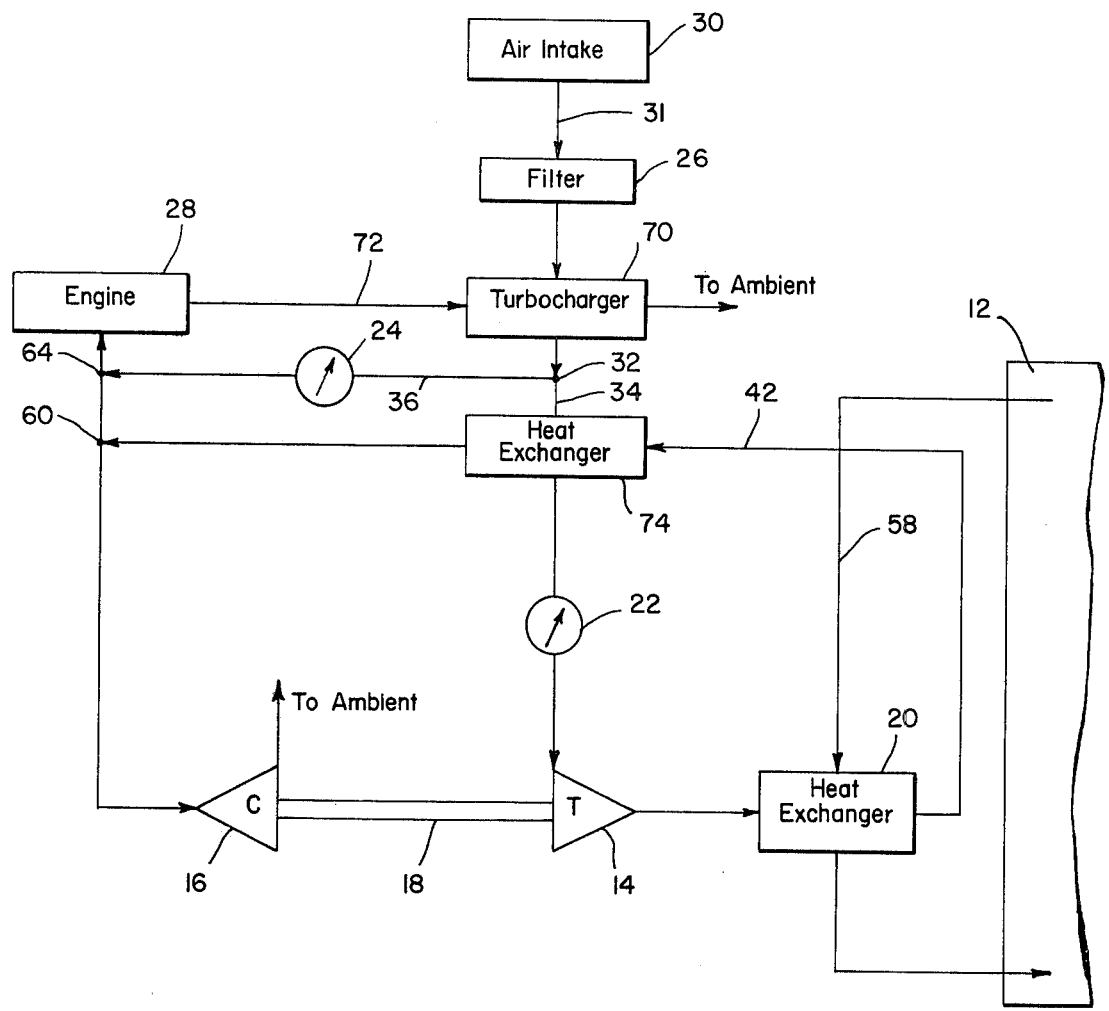
FIG. 5 is a generally schematic view similar to FIG. 4 showing the use of the air conditioning system of this invention in a turbocharged engine.

It may be desirable to utilize the air conditioning system of this invention in an airplane which utilizes a turbocharger to render the engine 28 capable of generating greater horsepower. Such as embodiment is illustrated in FIG. 5 which illustrates how the air conditioning system of FIG. 4 can be adapted for use with a turbocharger 70.

As is well known to those skilled in the art, exhaust gases from the engine 28 are fed into an exhaust pipe 72 and passed through the turbocharger 70 before being exhausted into the atmosphere. These exhaust gases power a turbocompressor. The turbocharger 70 is interposed in the conduit 31 so that intake air for the engine 28 is increased in pressure by the turbocharger. Because of this, the air fed to the throttle valves can be maintained at sea level atmosphereic pressure even during flight, thus enabling the propulsion engine 28 to operate more efficiently.

As previously described, the air from the air intake 30 reaches the junction 32 from which it passes either through the primary throttle valve 22 or secondary throttle valve 24 depending upon the power requirements of the engine. If the engine 28 is operating at a high power level, the air passes from the turbocharger 70 through the secondary throttle valve 24 directly to the intake manifold of the engine. If, however, the engine 28 is operating at a lower power level, the air is passed through the primary throttle valve 22 to operate the air conditioning system of this invention prior to entering the intake manifold of the engine 28.

As is well known, the air compressed by the turbocharger 70 is significantly increased in temperature both because of the compression of the air and because of the high operating temperature of the turbocharger due to its being powered by exhaust gases from the engine 28. Thus, it is desirable to cool the air in a heat exchanger 74 before expanding it through the turbine 14. Accordingly, the heat exchanger 74 is connected so that its secondary side is interposed into conduit 34 and the primary side of the heat exchanger 74 is interposed in the conduit 42.

As has been previously described, the air expanded through the turbine 14 is passed through the primary side of the heat exchanger 20 for cooling air to be circulated from the enclosure 12. The air in the conduit 42 is increased in temperature in the heat exchanger 20. However, it is still substantially cooler than the air which has passed through the turbocharger 70. Accordingly, by passing it through the air-to-air heat exchanger 74, much of the heat introduced by the turbocharger can be withdrawn prior to passage of the air through the air conditioning system.

The evaporative cooling means of FIG. 3 can also be utilized in the air conditioning system. Because the turbocharger serves to maintain the air fed to the valve 22 at atmospheric pressure, the pressure of the air reaching the heat exchanger 20 is still substantially less than atmospheric pressure and the enhanced evaporative cooling will result.

The air conditioning system of this invention may also be used to cool any gas or other fluid in an enclosure to be cooled as long as the fluid is capable of being circulated through the heat exchanger 20.

We claim:
1. In combination:
an enclosure to be cooled;
an engine having an air intake;
a source of air at substantially ambient pressure;
turbine means for receiving air from the source and lowering the temperature and pressure thereof;
heat exchanger means having a first flow path for receiving air from the turbine means to remove heat from the heat exchanger means;
compressor means driven by the turbine means for receiving air from the heat exchanger means, compressing the air and transmitting it to the engine air intake; and
means for circulating fluid from the enclosure through a second flow path of the heat exchanger means for giving up heat to the heat exchanger means.

2. The combination of claim 1 including valve means interposed between the source of air and said turbine means for controlling the flow of air to the engine air intake.

3. The combination of claim 2 wherein said engine operates over a range of power output and including bypass means connected between the source of air and said engine air intake and an additional valve means interposed in the bypass means for controlling the flow of air to said engine air intake above a predetermined value of engine power output.

4. The combination of claim 1 including means for spraying water into the air for removal of heat by vaporization in said heat exchanger means.

5. The combination of claim 4 wherein said water spraying means includes extraction means for removing condensed vapor from the second flow path of said heat exchanger.

6. The combination of claim 5 wherein said water spraying means further includes a tank of water to be sprayed into the air.

7. The combination of claim 1 wherein said fluid is air.

8. An air conditioning system for a vehicle having an enclosure to be cooled, a propulsion engine, and a source of air at substantially atmospheric pressure, said system comprising a heat exchanger, means for circulating air from the enclosure through one flow path of the heat exchanger, turbine means for expanding and cooling the air from said source, means for directing the expanded cooled air through another flow path of the heat exchanger for removing heat therefrom, compressor means driven by the turbine means for increasing the pressure of the air from the other flow and directing it to the engine.

9. An air conditioning system as in claim 8 including means for introducing fluid into said expanded, cooled air for absorbing heat by vaporization in said heat exchanger.

10. An air conditioning system for a vehicle having an enclosure to be cooled, a propulsion engine, and a source of air at substantially atmospheric pressure, said system comprising, a heat exchanger, means for circulating air from the enclosure through one flow path of the heat exchanger, turbine means for expanding and cooling the air from said source, means for directing the expanded cooled air through another flow path of the heat exchanger for removing heat therefrom, compressor means driven by the turbine means for receiving a first portion of the air from the heat exchanger increasing its pressure for exhausting the air, and means for directing a second portion of the air from the heat exchanger to the engine.

11. An air conditioning system as in claim 10 including means for maintaining the pressure of air from said source at substantially atmospheric pressure.

12. A method of cooling a fluid in a structure having an engine with an air intake, said method comprising the steps of circulating the fluid through a heat exchanger, passing air at a generally ambient pressure through a turbine a lower the temperature and pressure of the air, passing the air through the heat exchanger to withdraw heat from the fluid, passing the air through a compressor driven by the turbine to increase the pressure of the air, and introducing the air into the air intake of the engine.

13. The method of claim 12 including the additional steps of passing the air through a controllable valve before its passage through the turbine and controlling the valve to regulate the flow of air to the air intake of the engine.

14. The method of claim 12 including the additional step of causing generally ambient pressure air to flow directly into the air intake of the engine when the engine is operating above a predetermined power output.

15. The method of claim 12 including the step of evaporating water into the air after it has passed through the turbine for evaporation in the heat exchanger.

16. The method of claim 15 wherein vapor condenses from said fluid in the heat exchanger and including the step of withdrawing the condensed vapor for said evaporation into the air.

17. The method of claim 16 wherein water is stored in a tank and including the step of withdrawing water from the tank for said evaporation into the air.

* * * * *

UNITED STATES PATENT AND TRADEMARK OFFICE
CERTIFICATE OF CORRECTION

PATENT NO. : 4,018,060

DATED : April 19, 1977

INVENTOR(S) : Robert C. Kinsell; James C. Noe; Carl D. Campbell

It is certified that error appears in the above-identified patent and that said Letters Patent are hereby corrected as shown below:

Column 5, line 47, "atmosphereic" should read --atmospheric--.

Claim 8, line 9, after the comma (,), insert --and--;

line 11, after "flow", insert --path--.

Claim 12, line 5, "a" (second occurrence) should read --to--.

Signed and Sealed this

Twentieth Day of June 1978

[SEAL]

Attest:

RUTH C. MASON
Attesting Officer

DONALD W. BANNER
Commissioner of Patents and Trademarks